H. R. Foote,
Burning Hydrocarbon.
N° 58,087. Patented Sep. 18, 1866.
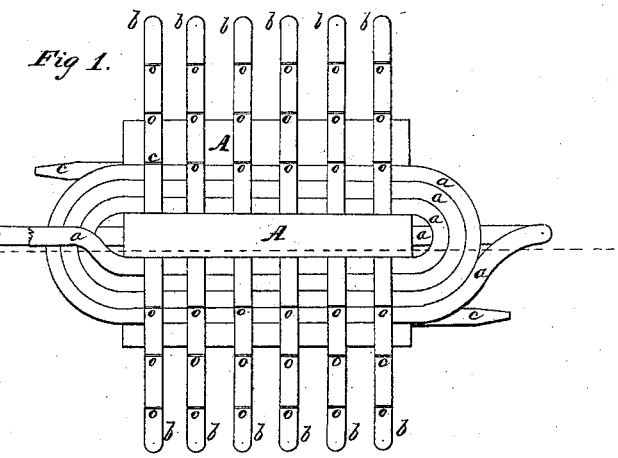
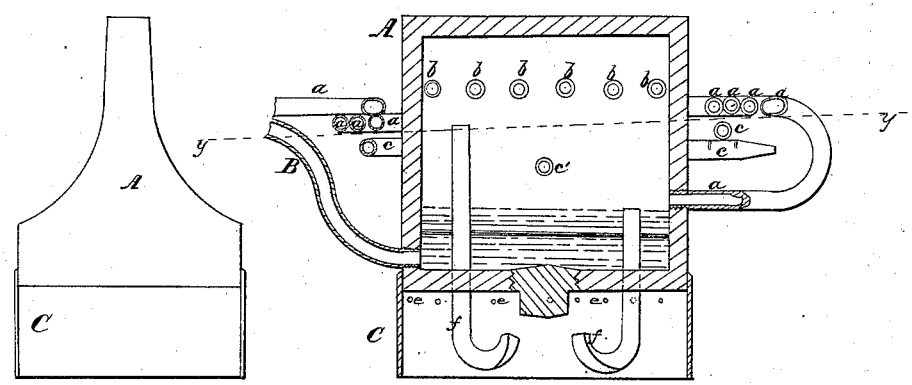
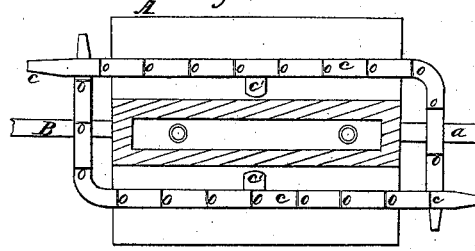
Witnesses:
Inventor:
H. R. Foote

UNITED STATES PATENT OFFICE.

HENRY R. FOOTE, OF OIL CITY, PENNSYLVANIA.

IMPROVED APPARATUS FOR GENERATING AND BURNING VAPORS OF HYDROCARBON OILS.

Specification forming part of Letters Patent No. 58,087, dated September 18, 1866.

*To all whom it may concern:*

Be it known that I, HENRY R. FOOTE, of Oil City, in the county of Venango and State of Pennsylvania, have invented certain new and useful Improvements in Methods of Generating and Burning the Vapors of Hydrocarbon Oils; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention consists in a novel plan or method of generating and combining before ignition the gas or vapor of hydrocarbon oils and hydrogen gas produced by the decomposition of steam, and then burning the same for the production of heat, either for generating steam or for any other purpose desired.

It also consists in a novel arrangement of devices for accomplishing this result.

A represents a hollow metallic vessel, the form or outline of which is shown in Figure 4, and which may be constructed of any suitable form and size. In practice I have used one made of cast-iron cast in a single piece, of the form here shown. This vessel I term "a combined retort and gas-holder," it being used for vaporizing the hydrocarbon, and also as a receptacle for receiving and mixing the vapor thus produced with the hydrogen gas, and supplying the gases thus mixed to the burners, as hereinafter explained.

A tube, B, serves to supply the vessel A with oil, which occupies the lower and wider part only.

In the bottom of the vessel A is inserted two or more tubes, *f*, as shown in Fig. 2, the upper ends of which extend up through the body of the oil in the vessel A, and thus having their upper ends, which are open, communicating with and supplied by the gases contained in the vessel above the oil. The lower ends of these tubes *f* are turned up, and terminate in burners, at which point the gas flowing therefrom is ignited, and thus made to heat oil in the reservoir and vaporize it. These burners are surrounded by a hood, C, which projects downward from the sides of the vessel A, and which serves to prevent the flame from being extinguished by a side draft, and which also serves to confine the heat generated by them under the bottom of the retort A.

Steam is taken from the boiler of the engine, or from any other source, and conveyed through the pipe *a*, which is coiled around the upper portion of the vessel A, as shown in Fig. 1, and which enters the vessel, as shown in Fig. 2. Just below this coiled pipe a series of burners are arranged in such a manner that the heat produced by them shall keep this coiled pipe *a* very hot, so that as the steam passes through this pipe *a* it shall be decomposed and produce hydrogen gas, which passes thence into the reservoir A, where it is mingled with the vapor of the hydrocarbon. In the drawings this series of burners for heating the coil is represented as a tube, *c*, connected to the reservoir A by a short tube, *c'*, the slits *o* across the tube *c* serving to permit the escape of the gas, and thus acting as burners, though it is obvious other forms may be used if desired.

In order to expedite the process of the decomposition of the steam in its passage through the heater *a*, the latter is filled with iron filings, so as to present to the steam a large amount of heated surface.

Another series of burners, represented by *b*, and having a large number of jets, project laterally from the sides of the vessel A, above the coiled pipe *a*, and near the top of the former. As these burners connect with the interior of the vessel A, it is obvious that the gases therein will flow out through the pipes *c*, and may be ignited at each of the slits or burners *o*, thereby producing a great flame and heat.

It is well known that the hydrocarbons have an excessive amount of carbon, and cannot be burned alone without a strong draft and a large supply of oxygen, and that when burned in the open air a dense black smoke, heavily laden with carbonaceous matter, is produced. By the addition of the hydrogen gas to the vapor produced from the hydrocarbons and the mingling and uniting of the two thoroughly, a far more perfect combustion is secured and a very intense heat produced, with a saving of fuel, and this is the result produced by my invention.

It will, of course, be understood that a heating apparatus constructed and operating on my plan may be used for any purpose where heat is desired; but the device here shown is more especially intended for generating steam for operating steam-engines. To use it, it is only necessary to locate it in proper position under the boiler and connect the pipe $a$ with the steam-boiler. When first lighted, and before there is any steam in the boiler, it will be obvious that there will be no gas to supply the burners. In that case the burners $f$ under the reservoir will burn the hydrocarbon itself at first, the vessel A being filled with it, so that it will pass out of said tubes and be ignited at their ends. As soon, however, as the oil is vaporized by the heat thus supplied, the supply of oil is lessened and the vapor only burned, and as soon as steam is furnished from the boiler the hydrogen gas is added to the vaporized oil, and the apparatus is then in working order.

Having thus described my invention, what I claim is—

1. The combined retort and gas-holder, constructed substantially as described.

2. The coil of metallic tubing charged with iron filings, or their equivalent, and the heaters, connected with the gas-holder, for the purpose of generating hydrogen gas by the decomposition of steam, substantially as and for the purpose set forth.

3. The tubes at the bottom of the retort, with supply-pipes elongated so as to extend into the gas-holder, as described.

4. The arrangement of burners connected with the gas-holder, substantially as described.

5. The hood attached to the bottom of the retort, for the purpose of protecting the lower burners, as described.

HENRY R. FOOTE.

Witnesses:
H. C. DODGE,
J. C. LATHROP.